US011416904B1

(12) United States Patent
He et al.

(10) Patent No.: US 11,416,904 B1
(45) Date of Patent: Aug. 16, 2022

(54) ACCOUNT MANAGER VIRTUAL ASSISTANT STAGING USING MACHINE LEARNING TECHNIQUES

(71) Applicant: CDW LLC, Vernon Hills, IL (US)

(72) Inventors: Yuxi He, Boulder, CO (US); Yuqing Chen, Evanston, IL (US); Sunrito Bhattacharya, Chicago, IL (US); Rajat Swaroop, Wheeling, IL (US); Gregory Tomezak, Buffalo Grove, IL (US); Andre Coetzee, Cary, IL (US); Joseph Kessler, Grayslake, IL (US); Suresh Bellam, Vernon Hills, IL (US); Dan Verdeyen, Glenview, IL (US)

(73) Assignee: CDW LLC, Vernon Hills, IL (US)

( * ) Notice: Subject to any disclaimer, the term of this patent is extended or adjusted under 35 U.S.C. 154(b) by 141 days.

(21) Appl. No.: 16/388,534

(22) Filed: Apr. 18, 2019

Related U.S. Application Data

(60) Provisional application No. 62/786,196, filed on Dec. 28, 2018.

(51) Int. Cl.
*G06Q 30/00* (2012.01)
*G06Q 30/06* (2012.01)
(Continued)

(52) U.S. Cl.
CPC ......... *G06Q 30/0611* (2013.01); *G06N 20/00* (2019.01); *G06Q 10/107* (2013.01)

(58) Field of Classification Search
CPC ..... G06F 40/284; G06F 40/20; G06K 9/6256; G06Q 30/0611; G06Q 10/107; G06N 20/20; G06N 20/00
(Continued)

(56) References Cited

U.S. PATENT DOCUMENTS 7,415,435 B1 8/2008 Weiss et al.
7,440,911 B1 10/2008 Fors et al.
(Continued)

OTHER PUBLICATIONS

"Artificial intellgence-based email conversations shown to quadruple lead engagement for more effective sales and marketing campaigns," Conversica, Google web search, Jun. 5, 2014, 5pgs. (Year: 2014).*
(Continued)

*Primary Examiner* — Robert M Pond
(74) *Attorney, Agent, or Firm* — Marshall, Gerstein & Borun LLP; Randall G. Rueth

(57) ABSTRACT

A method for machine learning-based account manager virtual assistant staging includes receiving a message and a classification, generating a staging record, generating a status using staging rules, generating an order when the message classification is order and the status is complete, and transmitting the order. An account manager virtual assistant staging system includes a processor and a memory storing instructions that cause the system to receive a message and a classification, generate a staging record, generate a status using staging rules, generate an order when the message classification is order and the status is complete, and transmit the order. A non-transitory computer readable medium contains program instructions that when executed, cause a computer to receive a message and a classification, generate a staging record, generate a status using staging rules, generate an order when the message classification is order and the status is complete, and transmit the order.

20 Claims, 3 Drawing Sheets

(51) Int. Cl.
  *G06Q 10/10* (2012.01)
  *G06N 20/00* (2019.01)
(58) Field of Classification Search
  USPC .............................................. 705/26, 27, 25
  See application file for complete search history.

(56) References Cited

U.S. PATENT DOCUMENTS

| | | | |
|---|---|---|---|
| 7,908,200 | B2 | 3/2011 | Scott et al. |
| 10,361,981 | B2 | 7/2019 | Bennett et al. |
| 10,475,095 | B2 | 11/2019 | Scott et al. |
| 2002/0069079 | A1 | 6/2002 | Vega |
| 2005/0209950 | A1* | 9/2005 | Clark ................ G06Q 40/04 705/37 |
| 2013/0030958 | A1* | 1/2013 | Michalski .......... G06Q 10/0838 705/26.81 |
| 2015/0372963 | A1* | 12/2015 | Root ................ H04L 51/32 709/206 |
| 2019/0220774 | A1* | 7/2019 | Terry ................ G06F 11/3466 |
| 2019/0361849 | A1* | 11/2019 | Rogynskyy ............ G06F 16/29 |
| 2020/0125919 | A1* | 4/2020 | Liu ........................ G06F 40/30 |

OTHER PUBLICATIONS

"Conversica Inc Obtains Patent for Systems and Methods for Configuring Knowledge Sets and AI Algorithms for Automated Message Exchanges," Global IP News. Information Technology Patent News [New Delhi] Jul. 17, 2018; Dialog #2071128432, 2pgs. (Year: 2018).*
Wikipedia: "Artificial Intelligence", retrieved from the Internet at: <https://en.wikipedia.org/w/index.php?title=Artifical_intelligence &oldid=875602267> (Dec. 27, 2018).
Wikipedia: "Extract, transform, load", retrieved from the Internet: <https://en.wikipedia.org/w/index.php?title=Extract,_transform_load &oldid=873266315> (Dec. 12, 2018).
International Application No. PCT/US2019/067475, International Search Report and Written Opinion, dated Mar. 16, 2020.
Zhang et al., Character-level convolutional networks for text classification, arXiv:1509.01626 [cs.LG] (2016).
Apache NiFi, downloaded from the Internet at: <https://nifi.apache.org/>, The Apache Software Foundation (2018).

* cited by examiner

ACCOUNT MANAGER VIRTUAL ASSISTANT STAGING USING MACHINE LEARNING TECHNIQUES

CROSS-REFERENCE TO RELATED APPLICATIONS

This application claims priority to U.S. Provisional Application No. 62/786,196, entitled ACCOUNT MANAGER VIRTUAL ASSISTANT USING MACHINE LEARNING TECHNIQUES, and filed on Dec. 28, 2018, which is incorporated herein by reference in its entirety. Additionally, the present application is related to U.S. patent application Ser. No. 16/293,205, entitled ACCOUNT MANAGER VIRTUAL ASSISTANT USING MACHINE LEARNING TECHNIQUES and filed on Mar. 5, 2019, the contents of which are hereby incorporated by reference in their entirety.

FIELD OF THE DISCLOSURE

The present disclosure generally relates to systems and methods for an account manager (AM) virtual assistant staging for facilitating quotes and orders. More particularly, to methods and systems for facilitating automated quote and order staging and processing via electronic communication using machine learning (ML) techniques.

BACKGROUND

Many companies operate in business areas wherein human AMs manually facilitate product quotation and ordering processes directly with customers. AMs may facilitate a request for quote (RFQ), generate a quotation and/or generate an order. Manual work performed by AMs is time-consuming, repetitive and error-prone. For example, an AM may receive an RFQ from a customer, and generate one or more quote and/or order based on the RFQ. An RFQ is often communicated to a company via an electronic communication means (e.g., via an Internet web site, an email, via telephone, etc.). Traditionally, an employee of the company (e.g., a quote processor, AM, or other employee) may receive RFQs, interpret the RFQ, validate the RFQ, route the RFQs to an appropriate person (e.g., an AM) and handle any follow-up, whether that follow-up is internal to the company or involves additional communication with the customer. Processing the RFQ may include the application of considerations specific to individual customers (e.g., discounts). Processing the RFQ may include modifying the RFQ and any subsequent quotations/orders in response to feedback from the customer as well as business constraints. For example, a quote may be modified in response to updated quantity, inventory levels, customer cancellations or other conditions.

An AM may identify the intent of an RFQ or other message (e.g., requesting a quote, placing an order, canceling an order, modifying an order, etc.) received from a buyer (e.g., a customer, purchaser, etc.). In some cases, a message may be eligible for immediate disposition based on analysis of the AM. For example, an AM may receive a message from an existing customer whose account is in good standing, wherein the message unambiguously identifies a quantity of product, pricing information, shipping instructions, etc. In that case the AM may immediately place an order on the customer's behalf. Some customer messages may not be capable of immediately disposition. For example, a message may be tentative in nature. For example, a message may request a quote and/or may contain information insufficient to allow the AM to place an order (e.g., an invalid or missing quantity).

An RFQ may identify one or more products and each identified product may correspond to a quantity. The customer may express interest in a given quantity of a given product using natural language. For an example, a customer may telephone an AM state, "I need to order 16 widgets." The employee interpreting the RFQ may manually extract information from the RFQ pertaining to the customer, the products and the quantities (e.g., whether the customer is previously known to the company, an identification of widgets being ordered, the respective quantity of those widgets, etc.). The employee may manually check an inventory and/or product information source and then manually generate a written quote and/or an order based on the information extracted. The employee may transmit the manually-generated quote and/or order to another employee (e.g., an AM) and/or to the customer who transmitted the RFQ to the company. These manual processes may be repeated for each RFQ transmitted to the company.

BRIEF SUMMARY

In one aspect, a computer-implemented method for machine learning-based account manager virtual assistant staging includes receiving, via an electronic network, an electronic message of a user and a message classification corresponding to the electronic message, generating an electronic staging record corresponding to the electronic message, generating a message complete status by analyzing the electronic message using a set of staging rules, when the message classification corresponds to an order and the message complete status is complete: generating an order corresponding to the message, and transmitting the order to the user.

In another aspect, an account manager virtual assistant staging system includes one or more processors and a memory storing computer-readable instructions that, when executed, cause the account manager virtual assistant staging system to receive an electronic message of a user and a message classification corresponding to the electronic message, generate an electronic staging record corresponding to the electronic message, generate a message complete status by analyzing the electronic message using a set of staging rules, when the message classification corresponds to an order and the message complete status is complete: generate an order corresponding to the message, and transmit the order to the user.

In yet another aspect, a non-transitory computer readable medium contains program instructions that when executed, cause a computer to receive an electronic message of a user and a message classification corresponding to the electronic message, generate an electronic staging record corresponding to the electronic message, generate a message complete status by analyzing the electronic message using a set of staging rules, when the message classification corresponds to an order and the message complete status is complete: generate an order corresponding to the message, and transmit the order to the user.

DETAILED DESCRIPTION

The present techniques include a virtual AM digital assistant for interpreting, classifying, staging, and processing RFQs and other message instructions. A multi-brand technology solutions company may provide a broad array of offerings, ranging from hardware and software to information technology (IT) product (e.g., security, cloud, data center and networking) services and solutions to customers in the public and private sectors. The technology solutions company may employ AMs who may receive many (e.g., thousands) respective RFQs per day from groups of customers relating to the different products and services the technology solutions company provides. The present techniques advantageously automate the interpretation and identification of specific customer requests and automate the AMs' facilitation of such requests.

The present techniques may include training one or more ML models using electronic messages (e.g., an email, a text message, etc.) sent to the company using one or more ML models. The one or more ML models may be trained to recognize specific requests of customers and/or AMs. For example, a general RFQ email inbox and/or an inbox of an AM may be monitored. Emails delivered to the email inbox may be automatically forwarded to an RFQ processing module in response to an event (e.g., the delivery of an email) to be analyzed by one or more trained ML model. The present techniques may process the output of the trained ML models to respond to the specific requests of the customer and/or AM. The present techniques may include information extraction and classification processes which are implemented using big data tools (e.g., Apache Hadoop and/or Apache NiFi), and the company may construct parallel computing environments for various purposes (e.g., for testing, development and production).

Example Computing Environment

Figure 1:
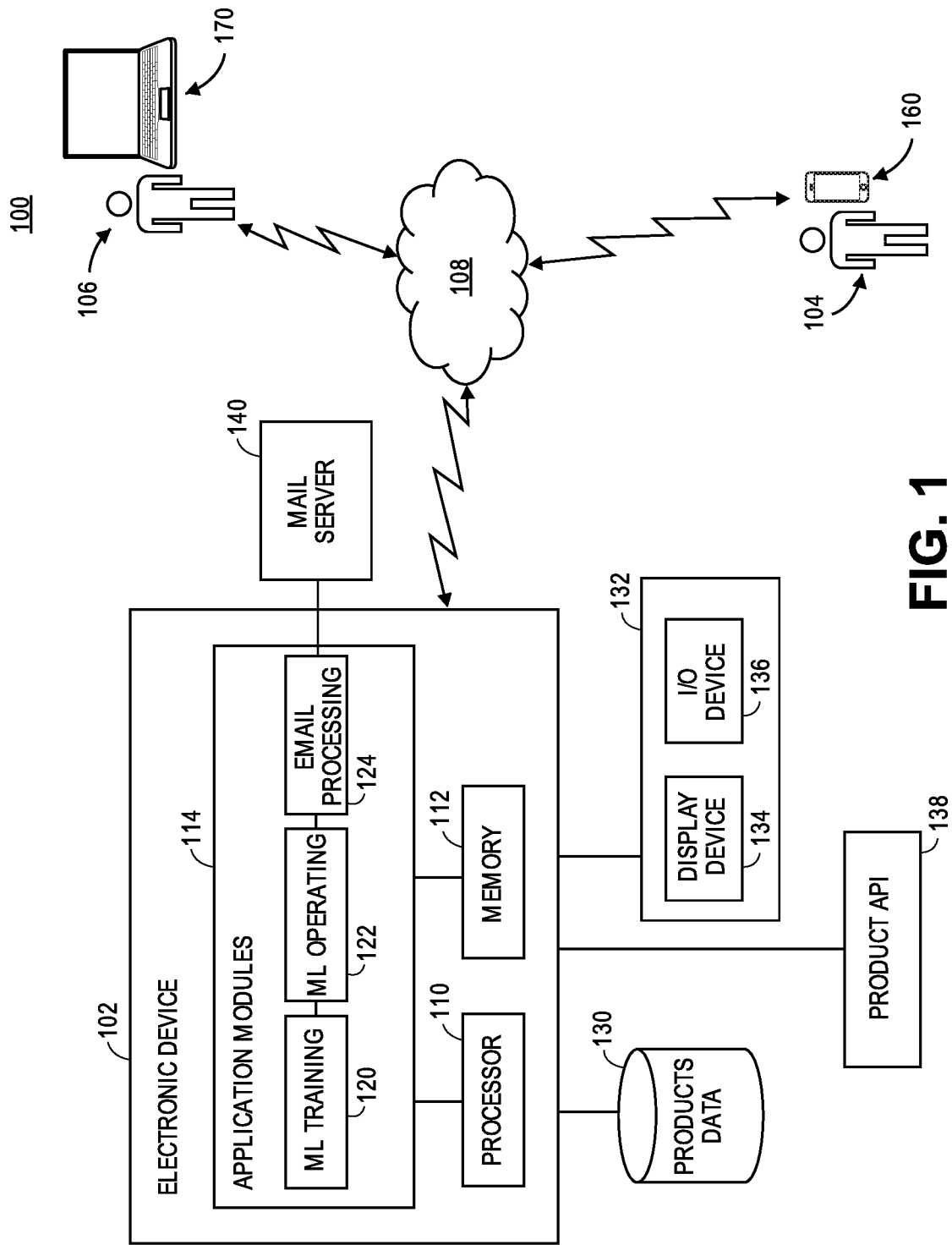
FIG. 1 depicts a system block diagram of an example environment for implementing an AM virtual assistant staging using machine learning techniques, according to an embodiment.

FIG. 1 depicts an example AM virtual assistant staging computing environment 100 in which the present techniques may be implemented, according to some embodiments. FIG. 1 may include an electronic device 102, a customer 104, an AM 106, and a network 108. The customer 104 and the AM 106 may access the electronic device 102 via the network 108. One or more customer 104 and one more AM 106 may be present in some embodiments.

The electronic device 102 may be a computing device such as a desktop computer, laptop, or server. The electronic device 102 may include a processor 110, a memory 112, and a set of application modules 114. The processor 110 may include any number of processors, including one or more graphics processing unit (GPU) and/or one or more central processing unit (CPU). In some embodiments, the processor 110 may include specialized parallel processing hardware configurations to permit the electronic device 102 to simultaneously train and/or operate multiple ML models (e.g., multiple GPUs, application-specific integrated circuits (ASICs), etc.). The memory 112 may include a random-access memory (RAM), a read-only memory (ROM), a hard disk drive (HDD), a magnetic storage, a flash memory, a solid-state drive (SSD), and/or one or more other suitable types of volatile or non-volatile memory. The processor 110 may execute computer-executable instructions stored in the memory 112. For example, the processor 110 may execute code stored in an SSD, causing data (e.g., a data set, a trained ML model, an email file, etc.) to be loaded into a RAM. The processor 110 may also cause an email file to be read from a file (e.g., from a memory or from a network location). The processor 110 may execute instructions stored in the memory 112 which instantiate, or load, the application modules 114.

The application modules 114 may include a plurality of sets of computer-executable instructions for performing the techniques described herein. For example, the application modules 114 may include an ML training module 120, an ML operating module 122, and an email processing module 124. Multiple processors 110 may execute the computer-executable instructions comprising the application modules 114 in parallel, such that for example, the ML training module 120 and the email processing module 124 may be used simultaneously by two or more processors 110 to, respectively, train an ML model and process an electronic communication input (e.g., an email, text message, etc.).

In general, the ML training module 120 creates new ML models, loads data (e.g., training data, trained models, etc.), trains the ML models and/or stores the trained models. The ML operating module 122 includes instructions for loading trained ML models and associated ML parameters (e.g., artificial neural network weights), and ML operation data. The email processing module 124 includes computer-executable instructions for reading raw email data and performing extract-transform-load (ETL) manipulations as well as data normalization. It should be appreciated that the plurality of modules in the application modules 114 may communicate with one another in a shared or unshared memory space. For example, the ML training module 120 may construct an ML model, train the ML model, and pass the trained ML model to the ML operating module 122 for use. The email processing module 124 may process a series of emails and feed each processed email, in bulk or in chunks, to the ML operating module 122, and so on. Furthermore, in some embodiments, additional or fewer modules may be included in the application modules 114. For example, the ML training module 120 may be split up into multiple ML training modules, wherein each individual module corresponds to training a particular type of machine learning model or subpart (e.g., one for a deep neural network, one for a long-short-term memory (LSTM) model, one for a simple recurrent neural network (RNN), etc.).

The electronic device 102 may be coupled to a products database 130 and a user interface 132, the latter of which may include a display device 134 and/or an input/output (I/O) device 136. The electronic device 102 may be further communicatively coupled to a mail server 140.

The database 130 may include one or more suitable databases (e.g., a structured query language (SQL) database, a flat file database, a key/value data store, an in-memory database, etc.). The database 130 may store trained models, training data and/or emails used by the application modules 114. The database 130 may provide information relating to email processing, customers and products (e.g., customer account numbers, Electronic Data Codes (EDCs), item descriptions, linguistic regular expression patterns, manufacturer codes, quantities, prices, etc.) to components of the virtual assistant computing staging environment 100 (or virtual assistant staging environment 100/environment 100). The database 130 may store data in one or more tables relating to emails having one or more columns (e.g., sub label, email ID, addresses to, email body, email subject, prior context, prior sender, email thread index, information extracted, etc.).

In some embodiments the application modules 114 may include a staging module (not depicted). The staging module may create, retrieve, update, and/or delete staged electronic records (e.g., in the database 130) representing staging state information. Each staged record including staging state information may be associated with one or more message having a respective message type (e.g., an RFQ, an email, a quote inquiry, an order instruction, etc.). It should be envisioned that many messages and message types are envisioned. The staging module may analyze the staged record using one or more staging rules. The one or more staging rules may cause actions to be taken based on qualities associated with the staged record. For example, each staged record may be associated with one or more states selected from a plurality of states. The staging module may set the state of the staged record based on the contents of the message (e.g., a header in an email, the identity of the sender, such as whether the sender is a government employee, etc.) and/or the output of an ML model that has analyzed the message. Staging techniques are discussed further below.

A user (e.g., a customer, an AM, etc.) may use the user interface 132 to access the electronic device 102. Specifically, the user may view information via the display device 134 and/or enter information via the I/O device 136. The display device 134 may be, for example, a computer monitor, screen, etc. The I/O device may include one or more computer peripheral devices (e.g., a mouse, keyboard, etc.). In some embodiments, the user interface 136 may be a single integrated device that includes both a display device 134 and an I/O device 136 (e.g., a tablet having a capacitive touch screen). The user may use the electronic device 102 to access the application modules 114 (e.g., to load data for training an ML model, or to load a saved model to test the predictions of the trained ML model, to view email in the mail server 140, etc.). The user may query a product application programming interface (API) 138 for information relating to various products.

The product API 138 may be an API for accessing information about the company's products. In some embodiments, the product API 138 may include multiple APIs relating to different companies. For example, the company may be a reseller of products from company B. In that case, product API 138 may permit a user of the electronic device 102 to programmatically obtain results relating to the products of company B such as: current price, quantity available, item weights/dimensions, logistical information (e.g., shipping times), etc. In some embodiments, the product API 138 may include an API for obtaining discrete information relating to a particular service (e.g., an API which allows the company to send mass/newsletter emails).

The mail server 140 may be a software component included within the electronic device 102 (e.g., an instance of the Postfix mail server or another open source mail server). In other embodiments, the mail server 140 may be provided by a third-party (e.g., a Microsoft Office 365 server). The mail server 140 may include instructions for pipelining email sent to particular email addresses (e.g., mail sent to AMANDA@cdw.com) associated with an AM digital assistant to the memory 112 and/or to particular modules within the application modules 114 for processing. The pipelined email may be transmitted using an email-based protocol or via direct transfer (e.g., via an operating system copying the email). For example, the mail server 140 may include instructions such that when an new email is received, and the email is addressed to AMANDA@cdw.com, the email is immediately provided to the email processing module 124 (e.g., as input to the standard input (STDIN) I/O stream of the email processing module 124). In another embodiment, the instructions may cause the mail server 140 to persist the email to a local or remote storage (e.g., the database 130) for later processing. The mail server 140 may permit the electronic device 102 to send/receive email messages according to standard email encodings/protocols, such as those specified in the Internet Engineering Task Force (IETF) Request for Comments (RFC) 2822, entitled, "Internet Message Format" and in accordance with the protocol designations of IETF RFC 2821, entitled "Simple Mail Transfer Protocol" and IETF RFC 3501, entitled "Internet Message Access Protocol." However, it should be noted that although the present techniques include a preferred embodiment involving email message transmission; as noted, other transport mechanisms (e.g., text messaging) may be used in some embodiments. In general, the mail server 140 receives messages (e.g., RFQs) from the customer 104 and the AM 106, and hands those messages off for further processing. The email server 140 may send and receive messages from customer to customer, from customer to AM and vice versa, and from AM to AM.

The customer 104 may use a customer device 160 to submit an RFQ via the network 108. For example, the customer 104 may use a mobile computing device (e.g., a smart phone, a laptop, etc.) to send an email or other electronic communication message, which includes an RFQ (e.g., a request for quote with respect to a particular product, an order instruction with respect to a particular product, a quote/order cancellation, a quote/order modification, etc.). In an embodiment, the customer 104 may submit the RFQ to the mail server 140 using a computer application provided by the company which may include shortcuts for RFQ submission (e.g., an order form). The RFQ may include a set of header fields followed by a body, including a message written in natural language:

From:example.user@example.com
To: AMANDA@cdw.com
Subject: Need a Quote.
Date: Thu, 26 Apr. 2018 22:09:27+0000
Hi Paul, We want a quote for the following products: Tripp Lite DVI Coupler Gender Changer Adapter Connector Extender DVI-I F/F EDC #1141357 QTY 5 Crucial MX500—solid state drive—1 TB—SATA 6 Gb/s EDC #4913706 QTY 2 C2G Value Series video cable—S-Video—25 ft EDC #1700883 QTY 2

The customer 104 may include one or more EDC numbers including respective corresponding quantities that the customer 104 desires to purchase within the body of the RFQ message. In some embodiments, EDC codes may correspond to services (e.g., cloud-based services) rather than products. Further RFQ examples are provided below. The customer 104 may also receive responses from other components within the AM virtual assistant staging environment 100 via the network 108 and the customer device 160. For example, the customer 104 may receive a quotation corresponding to the RFQ. The customer 104 may also place an order using the customer device 160, by transmitting an affirmative response message such as, "Place my order" or simply, "Yes" in response to a quotation message. The customer 104 may decline to place an order by transmitting a negative response (e.g., "No, thank you."). The email processing module 124 may interpret and process customer order confirmations.

The AM 106 may send messages (e.g., email) to the AM virtual assistant staging environment 100 (e.g., to the mail server 140) via the network 108. The AM 106 may use an AM device 170 to submit the email (or another message) via the network 108. For example, the AM 106 may use a mobile computing device (e.g., a smart phone, a laptop, etc.) to send an email or other electronic communication including an RFQ. In some embodiments, the AM 106 may send a message which corresponds to the customer RFQ:
From:AM@cdw.com
To: AMANDA@cdw.com
Subject: Need a Quote for Customer 104.
Date: Thu, 26 Apr. 2018 23:09:27+0000
Please prepare a quote for customer 104 including the following products: Tripp Lite DVI Coupler Gender Changer Adapter Connector Extender DVI-I F/F EDC #1141357 QTY 5 Crucial MX500—solid state drive—1 TB—SATA 6 Gb/s EDC #4913706 QTY 2 C2G Value Series video cable—S-Video—25 ft EDC #1700883 QTY 2

The mail server 140 may receive the message of the AM 106 and process the message as described with respect to message received from the customer 104. The AM 106 may receive an email response including a quotation corresponding to the RFQ, and may reply to the quotation with an affirmative or negative order response. The AM 106 may use an AM device 170 (e.g., a mobile device, laptop, desktop, etc.) to send and receive messages to components within the AM virtual assistant staging environment 100 via the network 108. The AM may include natural language such as "approve" or "cancel" in the body of a forwarded message, wherein the message being forwarded is an RFQ.

The network 108 may include the Internet and/or another suitable network (e.g., a local area network (LAN), a metropolitan area network (MAN), a wide area network (WAN), a mobile, a wired or wireless network, a virtual private network (VPN), etc.).

In operation, the electronic device 102 may be accessed by a user (e.g., a coworker of the AM 106) to perform offline training of one or more ML models, using the user interface 132. The user may load computer-executable instructions in the memory 112 which, when executed by the processor 110, cause an ML model to access training data (e.g., manually-labeled training data) stored in the database 130. The ML model may be iteratively trained until a loss function is minimized. Once the ML model is sufficiently trained, the ML model may be stored for later use in the database 130, Hadoop server, etc. Multiple ML models may be trained. For example, a first ML model may be trained to perform an information extraction function, and a second ML model may be trained to perform a classification function. The use of a hybrid random forest classifier and deep learning classifier to implement an AM virtual assistant is not currently known in the art.

Once the hybrid models are trained, the models may be loaded into the AM virtual assistant staging environment 100 at runtime, and used to process emails during the runtime of the AM virtual assistant staging environment 100. Specifically, the hybrid trained models may be used to analyze email messages received by the mail server 140. For example, the first ML model may be used to determine a set of (Item, Quantity) tuples within an RFQ sent by a customer/AM, wherein the Item uniquely identifies a product for sale and the Quantity identifies the respective quantity desired. As discussed below, the virtual assistant staging environment 100 may analyze the same email (e.g., the domain name of the sender of the email) to determine whether the email was sent by a customer or an AM. Depending on the results of information extraction and/or classification, the AM virtual assistant may take additional actions, as described below.

Example Preferred Message Staging Embodiment

Figure 2:
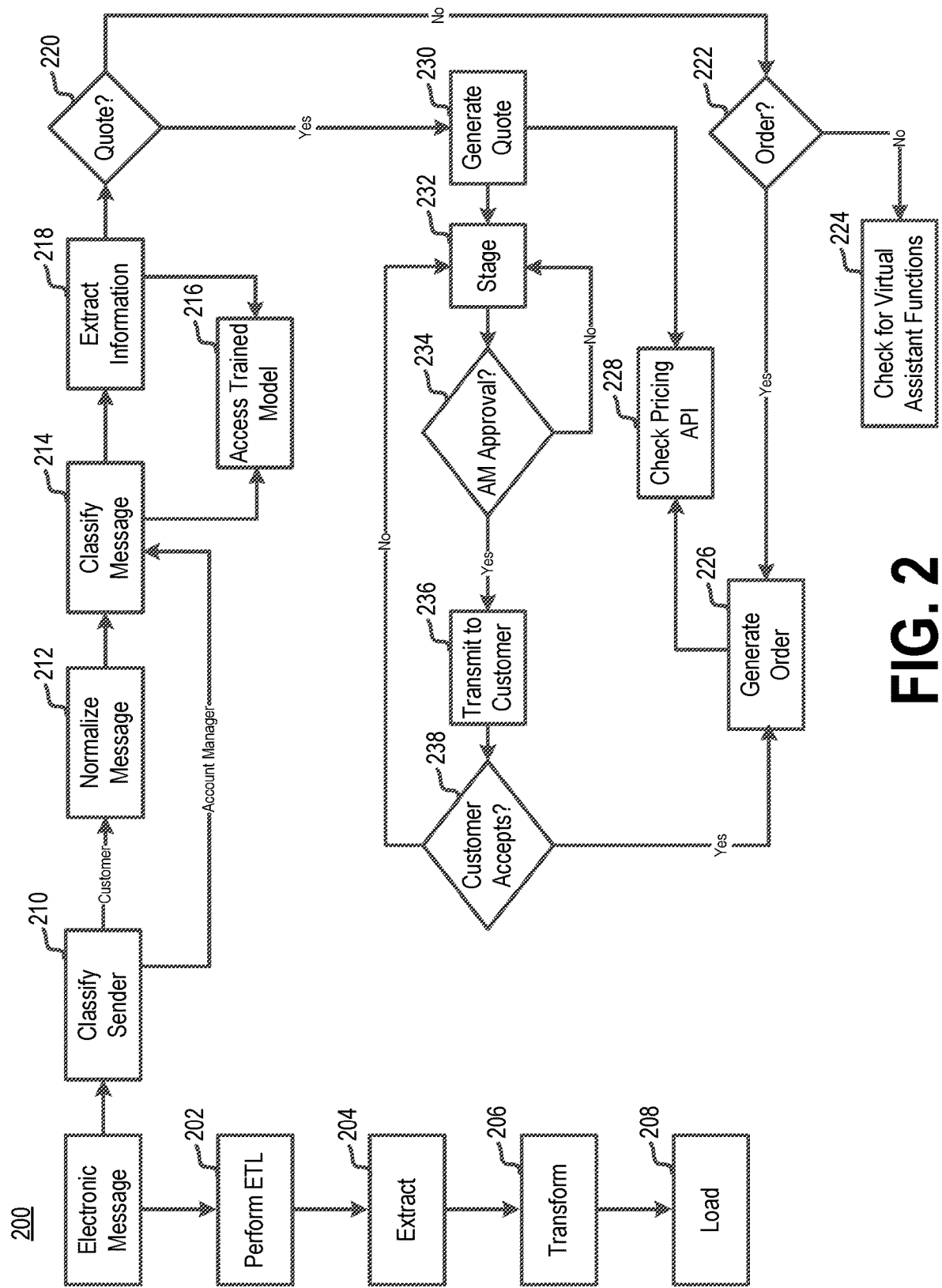
FIG. 2 depicts a flow diagram of an example message staging method, according to a preferred embodiment.

FIG. 2 depicts a flow diagram of a preferred example message staging method 200, according to an embodiment. The AM virtual assistant staging environment 100 may implement the method 200 for implementing automated processing and staging of electronic messages from users (e.g., customers, AMs, other employees, etc.). The method 200 may include performing an Extract-Transform-Load (ETL) procedure on an electronic message (block 202). The method 200 may receive an electronic message (e.g., an email) from a customer/AM and perform various ETL operations on the electronic message. The method 200 may parse metadata and data of the electronic message. Specifically, in an email context, the method 200 may examine the content type of the email message, and check whether the message is a multipart message. If the message is multipart, then the method 200 may loop through each subpart of the multipart message. For each part, whether single part or multipart, the method 200 may remove spurious information (e.g., emojis and whitespace) from the email message, save any attachments, decode the body of the message into a particular message encoding (e.g., UTF-8), and save the headers of the message. The method 200 may store some or all portions of the metadata and data of the electronic message. If the message is a text message, then the method 200 may execute a different set of instructions.

Each of the blocks in the method 200 may be implemented as respective sets of computer-executable instructions which may be loaded into memory. For example, the processor 110 of FIG. 1 may load any of the blocks (e.g., the block 210) as an application module in the set of application modules 114 of the electronic device 102 of FIG. 1. The blocks comprising the method 200 may be loaded, respectively and at different times, in the ML training module 120 and the ML operating module 122 of the set of application modules 114. The blocks may be executed independently of one another and/or in conjunction by the processor 110. In some embodiments, the blocks of the method 200 may process an email, and the use (or non-use) of a second block may be based on the output of a first block, or vice versa. The method 200 may, in some instances, cause a quote and/or an order to be staged.

It should be appreciated that the processing of a message via the method 200 may occur simultaneously, or nearly simultaneously, to the delivery of that message to an AM's inbox or to a staging area, as discussed below. For example, the present techniques may be configured so that a message may be delivered to an AM at the same time, or very briefly before, a quote based on that message is also delivered to the AM. In this way, an AM's message inbox (e.g., an email client) may appear to be delivered simultaneously. In some embodiments, a delay in email message delivery may be configured to allow the method 200 to process a message. In other embodiments, the delivery of an email message may be based on the completion of a process executed by a processor such as the processor 110. While the classification and information extraction steps may execute in any order, and/or simultaneously, performing classification prior to extraction may include certain benefits, such as avoiding the overhead of performing information extraction for each and every message received by the system 100.

The method 200 may be implemented using a visual flow building tool, such as Apache NiFi. Specifically, Apache NiFi is a flow-based automation tool that allows developers to define information processing flows within compute clusters. A NiFi implementation may include a host computer (e.g., the server 100) executing one or more Java Virtual Machines (JVMs), a flow controller including one or more processor and one or more extension, a web server, a FlowFile repository, a Content Repository, and/or a Provenance repository. The NiFi implementation may include local storage (e.g., memory 112).

Extract, Transform, and Load

The method 200 may analyze the message. For example, the method 200 may check whether the content type of the message is valid. If a particular document type (e.g., a spreadsheet) is found to be attached to the message, then the method 200 may transform each sheet of the spreadsheet into an individual machine-readable data structure, and may store the data structure. The method 200 may use a series of regular expressions for extraction of various parts of the message (e.g., a sender's name).

In addition to the sender's name, the method 200 may extract other headers using regular expressions, such as From, To, CC, Date, Subject, Return-Path, timestamp, sender telephone number, etc. The method 200 may also include logic for extracting a signature from an email message, and for checking the validity of the signature. Further, the method 200 may include instructions for masking personally-identifiable information (PII), such as credit card number, social security numbers, birth dates, and other potentially sensitive data. The method 200 may include instructions for determining whether the message is addressed to and/or sent from, a sender associated with the proprietor of the AM virtual assistant staging environment 100 by checking, for example, whether the sender's email or telephone number exists in a database such as the database 130. If the sender is known, then the method 200 may include a count of the number of internal email addresses included in the electronic message. The method 200 may output a data structure of all of the fields (e.g., headers, body, addresses, names, etc.) that the method 200 extracts from the electronic message. The data structure may be, for example, a delimited list. The extracted information/data output by the method 200 may be used to classify the message.

The method may retrieve/receive the electronic message from a mail server, such as the mail server 140. The ETL procedure may include extracting the message (block 204). For example, the method 200 may retrieve the electronic message from a mail server (e.g., an IMAP server). The method 200 may separate a body of the message from metadata of the message (e.g., headers) and/or attachments of the message. The method 200 may include transforming the electronic message (block 206). For example, attachments (e.g., images, text, etc.) may be compressed or scanned for viruses or malware. The method 200 may include loading the electronic message (block 208). For example, the method 200 at block 208 may copy the message to a file stored on a file system (e.g., the memory 112) and/or to an electronic database (e.g., the database 130). In some cases, the method 200 may load data into a data warehouse that is physically remote from the system 100, yet which is accessible via the network 108.

Classifying the Sender

The method 200 may include classifying the sender of the message by analyzing the sender email address (block 210). For example, at block 210, the method 200 may analyze one or more email headers corresponding to the sender of an email. For example, when the message is an email message, some headers that the method 200 may analyze to determine the sender may include the From header, Reply-To header, Return-Path header, etc. The analysis at block 210 may include parsing an email address and/or addr-spec as defined in RFC 5322. For example, the method 200 may include a regular expression for analyzing an email address such as "John Smith <jsmith@example.com>" to extract a domain name (in this case, example.com). The method 200 may generate metadata corresponding to the electronic message. For example, the sender classification step at block 210 may generate a flag indicating that the sender is affiliated with a governmental entity. The generated metadata may stored in the memory 112 of the electronic device 102, and made available to/accessed by other blocks of the method 200. The method 200 may include checking the domain name of an email address associated with the message against a predetermined list of domain names to determine whether the domain name corresponds to an AM or a customer. For example, if the domain name is example.com, then the block 210 may classify the message as belonging to an account manager and if the domain name is any other domain name, then the block 210 may classify the message as belonging to a customer.

Normalizing the Message

When the message is that of a customer, the method 200 may normalize the body of the message (block 212). In general, the normalization step at block 212 includes transforming the message to produce a second message having a standardized set of information. For example, when the message is an email, the method 200 may decode the name of the sender using a series of regular expressions as follows:
Decode the original name
sender_name=FullDecode(unicode(sender_name_orig, errors='ignore'))
If the name is an email address, return empty string
if '@' in sender name:
   return ' '
If the name is 'Fistname Lastname (extra info)', remove extra sender_name=re.sub(r'\((.*)\)', ' ', sender_name)
If the name is 'Fistname [extra info] Lastname', remove extra sender_name=re.sub(r'\[(.*)\]', ' ', sender_name)
If the name is 'Fistname Lastname –X', remove substring from –X sender_name=re.sub(r'–X(.*)', ' ', sender_name)
If the name is 'Fistname Lastname II or III', remove substring from I sender_name=re.sub(r'II(.*)', ' ', sender_name)
If the name is 'Fistname Lastname via . . . ', remove substring from via sender_name=re.sub(r'via(.*)', ' ', sender_name)
If the name is 'Fistname Lastname—Contractor', remove substring from—sender_name=re.sub(r'—Contractor(.*)', ' ', sender_name)
If the name is 'Fistname Lastname x—extra info', remove substring from x sender_name=re.sub(r'\w—(.*)', ' ', sender_name)
If the name is 'Fistname Lastname—extra info', remove substring from —sender_name=re.sub(r'—(.*)', ' ', sender_name)

In this way, each message of a customer will include a sender name that is consistently formatted and validated across all received messages. The method 200 may normalize one or more other fields/headers of a message according to normalization strategies. As another example, the body of messages may be normalized to remove emojis, or to convert graphical emojis to their textual counterparts.

The method 200 may include various computer-executable instructions for normalizing the data output by the method 200. For example, the method 200 may access a table of information (e.g., from a flat file, or a database such as the database 130). The table of information may include a set of rows, wherein each row includes an EDC, an advertised price, a company code, and a manufacturer's code. The method 200 may normalize the body of an email output by an ETL subroutine method 200, such that the specific product information included in the body is modified/rewritten to conform to universal strings. For example, multiple electronic messages may include different hyperlinks which each point to the website of the company, but which each include different subdomains and/or subfolders (e.g., deep links). The method 200 may include instructions for processing each electronic message body and rewriting any such links so that each one is replaced by a string such as 'CDWURL.' The method 200 may perform similar transformations for external links (i.e., those links to organizations other than the proprietor), manufacturer codes, EDC codes, quantities, prices, etc.

The method 200 may store some, or all, input and/or output in the database 130 or another suitable location. For example, the method 200 may write its output to the database 130 and the method 200 may load some or all of that data from the database 130 at a later time. The method 200 may store the normalized electronic message in association with the original electronic message, and/or the result produced by the method 200. It should also be appreciated that the method 200 may provide its output to other processors downstream (e.g., to a Hadoop instance). The electronic message (e.g., an .eml file) and the output of the method 200 may be stored in the database 130 using a relational linkage (e.g., using one or more primary keys, a one-to-many or many-to-many relationship in an SQL database).

In general, once the method 200 has ETLed and normalized the electronic message, whether the message is received via email or otherwise, the company may want to process the message further. As noted, the message may be from a customer (e.g., the customer 104) or an AM (e.g., the AM 106). Therefore, the company may want to analyze the message to determine the identity of the sender, to obtain a mapping between any items and quantities that appear in the message, and/or a mapping between any items and EDC/manufacturer codes within the message. Another component of the method 200 may use the item/quantity and/or item/code mappings to generate a quote for the customer and/or AM, and/or to stage the message appropriately, as discussed below. The identity of the sender may be analyzed by downstream components to determine specific actions.

Training and Operating a Message Classification Model

The method 200 may include classifying a message (block 214). Classifying the message may include identifying the intent of the message. For example, the classification step at block 214 may determine whether an email message is a quote, an order, a quote modification, etc. In an embodiment, the method 200 may include training a random forest binary classifier using manually-labeled messages (e.g., emails) divided into quote/non-quote categories (e.g., wherein each message in a training data set is labeled with a 1 or 0 depending upon whether that message represents a quote or not). Non-quote messages may be further subcategorized, in terms of whether the non-quote message literally includes the word "quote" or a derivation thereof (e.g., "QuOtE," "quoting," "quoted," "pricing," etc.). The classification training data set may comprise a plurality of rows, wherein each row includes an email body, a set of from addresses, a label, and an indication of whether the email body includes a derivation of the word "quote" or similar. In an embodiment, the email body may be normalized as described with respect to the normalization step 212. Duplicates may be removed from the training data set.

The method 200 may then generate a set of features for each row in the training data set using a feature generation module (not depicted). The feature generation module may be implemented as an additional module in the set of application modules 114. The feature generation module may process each email body and set of from addresses within each row in the training data set using computer-executable instructions (e.g., conditional statements, loops, regular expressions, etc.). First, the feature generation module may convert the email body to lowercase. The feature generation module may use a regular expression to determine whether certain types of phrases appear within the email body. For example, the feature generation module may use regular expression such as the following to determine whether the email body likely includes an attachment: ((attached|please|if|do|i|here|get) (is|find|see|you|we|need-|into) (your|the|need|to) (requested|attached|a separate|re-|corrected|above) quote)|((attached|several) [^/./!/?/,/"]{0,9} (quote|quotes)\s(you|were) requested)|((quote|please|this) (use|forward|order|quote|find) (information|quote|converted))|((i|please|ordered|will|shall|can) (provided|archive|update|from|find|generate) (a|the|this|another|attached|the) (quote|the))|((can|may)\s(i|we) [^/./!/?/,/"]{0,12}\s(status))| ([^/./!/?/,/"]{0,7}renewal quote)|(please (reply|respond) to e-mail)|((added|provide|don\'t|may|update|not) (to-|him|need|understanding) (a|this|the|that) quote)|((updat-ed|revised|attached|can|your|to) (quote|quotes))

The method 200 may access one or more trained models when classifying the message, as discussed below (block 216). Messages which may be classified include messages from customers and account managers. To classify the message, the method 200 may apply the message to a trained machine learning model that was previously trained offline. For example, the ML operating module 122 may apply the normalized email message to a previously-trained machine learning model (e.g., a random forest classifier) that resides in a memory (e.g., the memory 112, a Hadoop server, etc.). At runtime, the trained model may be loaded into a memory where it is available for use to predict whether a given message corresponds to an RFQ. The trained machine learning model may output a 1 or 0, indicating whether the message is an RFQ or not.

In some embodiments, accessing the trained model at block 216 may include executing multiple trained binary classifiers. For example, the method 200 may include applying the message to a first binary classifier to determine whether the message corresponds to a quote. The method 200 may include applying the message to a second binary classifier to determine whether the message corresponds to an order. The method 200 may execute the second binary classifier based on the result of the first classifier. For example, the second classifier may only be executed if the first classifier indicates that the message is not a quote. The method 200 may executed more than one trained classifier in sequence and/or in parallel with respect to a given message. Multiple messages may be analyzed by multiple sets of classifiers simultaneously. The method 200 may abort based on certain criteria.

In some embodiments, the trained model accessed at block 216 may include one or more binary classification model trained by the ML training module 120. The trained models at block 216 may be operated by the ML operating module 122. The ML training module 120 may chain multiple trained models together to form a multiclass classifier. In other embodiments, the ML training module 120 may train a single multiclass classifier wherein the message is assigned to one of a number of classes (e.g., "order", "quote", "instruction", "order modification", etc.). In still further embodiments, a multi-label classifier may be used in which the message is assigned to one or more of a number of classes. As discussed below, a staging flow may be developed wherein various stages of a message workflow are mapped to one or more classes. The application modules 114 may include a rules module for executing one or more rules for a message based on the message belonging to one or more class. Such a staging flow may be used by the account manager virtual assistant to provide staging functionality to a user (e.g., an AM). Each classification ML model trained by the ML training module 120 may output a confidence with respect to each classification produced. For example, a binary classifier may output a tuple (0.85,0.15) based on the confidence that the message corresponds to a particular class. A multiclass classifier may output a list of confidences corresponding to the classifier's confidence that a message belongs to a corresponding list of classes.

In an embodiment, the random forest binary classifier may be trained using a partitioned training data set. For example, the training data set may be partitioned according to a 70/30 split, respective to training and test data. The model may be fit to the training data, and various attributes of the trained model may be calculated (e.g., and out-of-bag score, accuracy score, precision score, recall score, confusion matrix, etc.). The trained model may be stored for later use, for example, in the memory 112 or the database 130. The trained model may also be loaded at a later time, and used to predict whether an email is an RFQ, or not. For example, an email body including, "order for roc. matt, good afternoon. quote for 50 ssd samsung evo 250 gb drives shipping to roc. thanks" and an email of "customer@example.com" may be analyzed by normalizing the email body, and performing feature generation on the output of the normalization.

Techniques are known which depend entirely upon using regular expressions to attempt to extract part numbers and quantities, and/or to attempt to determine the intent of messages. However, such approaches are not robust and have been demonstrated to have precision, accuracy and recall that is inferior to the ML-based techniques described herein. Further, the regular expression-based approaches are difficult to understand due to the intense symbolic complexity required in programming. Regular expressions are also not self-documenting in the way that most ML code is, and are difficult to debug. Therefore, the present techniques represent a significant leap forward by allowing the account manager virtual assistant techniques to 1) robustly identify the intent of messages, and to 2) robustly determine part numbers and quantities; and, based on 1 and 2, automate tasks involving customers and AMs. Further, the pricing API may return information in addition to pricing information. This additional information may be displayed to the AM in conjunction with a quote, so that the AM can see not only pricing but also the additional information, allowing the AM to make a more informed decision as compared with any current approaches that may include only pricing.

Feature Generation

Feature generation may be used to generate features for classification, prior to classifying a message. For example, the method 200 may generate features using a separate regular expression to determine whether the email body includes a request word (e.g., "would," "could," "can," etc.) followed by the word "quote," and yet another regular expression to determine whether the email body includes a verb word (e.g., "need," "desire," "want," etc.) followed by the word "quote" or similar (e.g., a derivation thereof, or a word having a similar meaning). The method 200 may cross-reference the set of from email addresses against a list of distribution domains. The distribution domains may be domain names of partner companies who distribute products on behalf of the company. The method 200 may include additional logical checks for a number of additional features, such as whether certain phrases occur in the email body (e.g., "please", "quantity", "mfgnumber", "iteminfo", etc.). These logical checks may be performed in code and/or using regular expressions. The method 200 may generate a list containing values of each of the respective examined features, wherein the values are simple or complex datatypes. For example:

return [contain_EDC_1, contain_MFG_1, contain_EDC_2, contain_MFG_2, contain_QTY, contain_Price, contain_cdw_url_prod, contain_cdw_url, contain_ext_url, contain_item_info, please_in_email, request_in_email, attach_is_the_quote, bid_email]

Of course, the above list is merely one possible list or set of relevant features, and it should be appreciated that other useful combinations of features are envisioned. Different sets of features may become more or less relevant due to changes in business constraints and communication patterns. For example, features that may be used to identify a request on the part of a user include:

[could_you_match,
wild_card_1_word_count,
wild_card_1_character_count,
wild_card_2_word_count,
wild_card_2_character_count,
wild_card_3_word_count,
wild_card_3_character_count]

In another example, features for a verb quote include:
[verb_a_quote_match,
wild_card_1_word_count,
wild_card_1_character_count,
wild_card_2_word_count,
wild_card_2_character_count,
wild_card_3_word_count,
wild_card_3_character_count]

In general, many features may be identified and used to program the system to extract any suitable types of information that may be indicative of a particular message type:

[is_distribution_domain, contain_EDC_1, contain_MFG_1, contain_EDC_2, contain_MFG_2, contain_QTY, contain_Price, contain_cdw_url_prod, contain_cdw_url, contain_ext_url, contain_item_info, please_in_email, request_in_email, attach_is_the_quote, bid_email]

In general, features identify whether a particular electronic message (e.g., an email or text message) includes a particular aspect. For example, questions such as whether a sender's email address belongs to a customer or partner (e.g., distribution partner), whether the body of an email includes phrases indicative of a call to action, whether the email include an EDC number, etc. Such features may not be dispositive of customer/AM intent when viewed in isolation. However, the method 200 may associate a set of features with each row in the training data set, and then use the combination of the labeled normalized email, and the features, to train a classifier machine learning model (e.g., a random forest classifier).

Training and Operating an Information Extraction Model

The method 200 may include extracting information from the message using a trained ML model (block 218). In some embodiments, extracting information may include accessing one or more trained models (block 216). The models accessed at block 218 may be the same or different as those accessed at block 214. Accessing one or more trained models may include making a network call (e.g., via the network 108) and/or by accessing a database (e.g., the database 130). The one or more trained models may be trained and used by the method 200 as discussed with respect to FIG. 1. Accessing the trained models may include loading the one or more trained models via the ML operating module 122, and/or the ML training module 120. Accessing the one or more trained models may include submitting data to the ML operating module 122 (e.g., via an API call) and receiving a result. For example, an application module in the application modules 114 may pass the message to the ML operating module 122, wherein the ML operating module 122 may process the message using an already-trained ML model, and return the result of processing the message to the application module (e.g., a classification, a set of extracted information, etc.). One or more input layers of the trained ML model may be configured to receive aspects of the message (e.g., headers, body, etc.).

The ML modules accessed during information extraction may be pre-trained offline and loaded by the method 200 at runtime. Information extraction at block 218 may identify information needed to generate a quote such as part numbers and respective quantities by analyzing free-form messages, including those RFQs that the trained information extraction ML model has not previously examined. In an embodiment, the method 200 may create a mapping of all possible combinations of items and quantities (e.g., N number items and M possible quantities), based on a curated training data set and compute the cross product of N and M giving N×M records. Each record may include a label=1 representing a correct pairing, and a label=0 representing an incorrect pairing. Each message in a training data set may be associated with multiple instances of 1s and 0s. The N×M matrix may include one row for each message in the training data set, wherein each message is normalized at block 212, and each message/row is associated with every possible combination of item from 1 . . . M and each possible quantity from 1 . . . N, and each message/row is associated with a label of 1 or 0, depending upon whether the item and quantity appear within the normalized email. This N×M matrix may then be used by the ML training module 120 to train an ML model. The ML training module 120 may, in some embodiments, include instructions for evaluating the precision and/or recall of trained models using a subset of training data.

In an embodiment, a training module (e.g., the ML training module 120) may use the N×M matrix to train an artificial neural network (ANN) and/or a deep learning classifier, wherein the network determines the highest confidence score of the mappings from item to quantity. The ML training module 120 may use word embeddings, word counts, and/or character counts corresponding to messages as training data. The ML training module 120 may shuffle the N×M matrix to avoid biasing the network during training and then divide the N×M matrix into three respective training, validation, and test data sets, according to, for example, a 70/20/10 split. In an embodiment, the ML training module 120 may include a character-level tokenizer which tokenizes each normalized email in the N×M matrix. The character-level tokenizer may be suitable, whereas a word-level tokenizer is not, due to the fact that many of the words tokenized are not vocabulary words in a lexicon, but are rather numbers (e.g., part numbers, quantities, etc.) which have no independent meaning. By using character-level embeddings, the ML model can be made to recognize patterns that are language-independent.

The ML training module 120 may construct an ANN, wherein a first layer accepts a matrix of the size of the tokenizer, and which outputs a 3D tensor having a dense embedding of a fixed size (e.g. 256). A next layer may be a one-dimensional convolution layer, having an output dimensionality of 64, a window length of 3, using a rectified linear unit activation function. A third layer may be a max pooling one dimensional convolution layer having 3 max pooling windows. A fourth layer may be a one-dimensional convolution layer having an output dimensionality of 32. Layers 5-7 may be, respectively, LSTM layers having respective output dimensionality of 64, 32, and 16. Each LSTM layer may include recurrent dropout (e.g., 0.5). The final layer may be a deeply-connected neural network layer having an output dimensionality of 1, and using a sigmoid activation function. In an embodiment, the ANN may include a different architecture. For example, the ANN may include only the first layer and the final deeply-connected neural network layer. In yet another embodiment, a second layer may be inserted in between the first layer and the final deeply-connected neural network layer, wherein the second layer is a recurrent neural network (RNN) having a fixed output dimensionality (e.g., 128) or wherein the second layer is an LSTM having a fixed output dimensionality (e.g., 256). The training may include a binary cross-entropy loss function in some embodiments, along with a root mean square optimizer. The respective ANNs may be trained using the training data subset of the N×M matrix as training input for a varying number of epochs (e.g., 9, 15, 10, 11, etc.) using differing batch sizes (e.g., 32 or 64). The embodiments described have demonstrated real-world accuracy above 70, precision above 70, and recall above 58 using curated training data sets. Training using larger training data sets may improve all three metrics.

Once the data extraction ML model is trained, the ML model may be used to extract information from free-form RFQs which. For example, returning to the above example, the first message may read:

Hi Paul, We want a quote for the following products: Tripp Lite DVI Coupler Gender Changer Adapter Connector Extender DVI-I F/F EDC #1141357 QTY 5 Crucial MX500—solid state drive—1 TB—SATA 6 Gb/s EDC #4913706 QTY 2 C2G Value Series video cable—S-Video—25 ft EDC #1700883 QTY 2

Subsequent messages may read as follows:

| Message Number | Message Body |
| --- | --- |
| 2 | Hi Paul, Would you be able to generate the quote for below items? Tripp Lite DVI Coupler Gender Changer Adapter Connector Extender DVI-I F/F unspsc #1141357 x5 Crucial MX500 - solid state drive - 1 TB - SATA 6 Gb/s unspsc #4913706 x2 C2G Value Series video cable - S-Video - 25 ft unspsc #1700883 x2 |
| 3 | Hi Paul, Hope everything goes well with you! I just want to check if you could provide a quote on the items listed below? Tripp Lite DVI Coupler Gender Changer Adapter Connector Extender DVI-I F/F mfg part: 1141357 (5) Crucial MX500 - solid state drive - 1 TB - SATA 6 Gb/s mfg part: 4913706 (2) C2G Value Series video cable - S-Video - 25 ft mfg part: 1700883 (2) |
| 4 | Hi Paul, How are you doing? It would be great if you could generate a quote for me containing the items below. Thanks Tripp Lite DVI Coupler Gender Changer Adapter Connector Extender DVI-I F/F 5 of |

| Message Number | Message Body |
| --- | --- |
| | CDW Part: 1141357 Crucial MX500 - solid state drive - 1 TB - SATA 6 Gb/s 2 of CDW Part: 4913706 C2G Value Series video cable - S-Video - 25 ft 2 of CDW Part: 1700883 |
| 5 | Hello, please quote the following: Tripp Lite DVI Coupler Gender Changer Adapter Connector Extender DVI-I F/F CDW Part: 1141357 q5 Crucial MX500 - solid state drive - 1 TB - SATA 6 Gb/s CDW Part: 4913706 q2 C2G Value Series video cable - S-Video - 25 ft CDW Part: 1700883 q2 |
| 6 | Good morning Paul, Would you please send me the quote on these following items? Thanks Tripp Lite DVI Coupler Gender Changer Adapter Connector Extender DVI-I F/F CDW Part: 1141357 5pcs Crucial MX500 - solid state drive - 1 TB - SATA 6 Gb/s CDW Part: 4913706 2pcs C2G Value Series video cable - S-Video - 25 ft CDW Part: 1700883 2pcs |
| 7 | Hi Paul, Let me know if you can quote on the following items and send it to me. Thanks Tripp Lite DVI Coupler Gender Changer Adapter Connector Extender DVI-I F/F Part1141357 qnty 5 Crucial MX500 - solid state drive - 1 TB - SATA 6 Gb/s Part4913706 qnty 2 C2G Value Series video cable - S-Video - 25 ft Part1700883 qnty 2 |
| 8 | Hi Paul, Our company would like these following items quoted asap. Let me know when you can send it over. Thanks Tripp Lite DVI Coupler Gender Changer Adapter Connector Extender DVI-I F/F CDW Part 1141357 quant 5 Crucial MX500 - solid state drive - 1 TB - SATA 6 Gb/s CDW Part 4913706 quant 2 C2G Value Series video cable - S-Video - 25 ft CDW Part 1700883 quant 2 |
| 9 | Hi Paul NEED THIS ASAP!!! Can you please send me a quote for the following: Tripp Lite DVI Coupler Gender Changer Adapter Connector Extender DVI-I F/F UNSPSC: 1141357 Quantity: 5 Crucial MX500 - solid state drive - 1 TB - SATA 6 Gb/s UNSPSC: 4913706 Quantity: 2 C2G Value Series video cable - S-Video - 25 ft UNSPSC: 1700883 Quantity: 2 |

Despite the fact that the part numbers are expressed disparately in the free-form RFQs above (e.g., "EDC #1141357", "unspsc #1141357", "mfg part: 1141357", etc.), and despite the fact that the quantities are also expressed disparately (e.g., "q2", "2pcs", "Quantity: 2", "2 of", "(2)", "x2", etc.), the trained information extraction ML model may output identical EDC/quantity tuples in all cases: (1141357,5), (4913706,2), (1700883,2). Therefore, the method 200 may capably train one or more ML models to correctly determine EDC numbers and associated quantities from free-form text. Herein, EDC numbers, manufacturer part numbers, and item numbers may all refer to a numeric or alpha-numeric code used to identify products. In this way, AMs no longer need to manually log product code and associated quantity information contained in customer RFQs, and rigid order forms typically used to collect such information may be entirely eliminated, increasing the power of electronic communication means (e.g., email) to transmit such information.

Message Handling by Message Class

The method 200 may process the message based on the message classification. For example, the method 200 may determine whether the classification corresponds to a quote (block 220). When the classification does not correspond to a quote, the method 200 may determine whether the classification corresponds to an order (block 222). When the classification does not correspond to an order, additional classification types may be checked (not depicted) and/or the method 200 may analyze the message to identify virtual assistant instructions (block 224). In some embodiments, the method 200 may process the message further, to determine whether the message corresponds to a command from an AM with respect to performing a particular virtual assistant-related function. For example, in some embodiments, the system 200 may include the ability to analyze a message that does not correspond to an quote or order further to (e.g., to identify a command from an AM to map a customer's email address to a particular customer number, to retrieve tracking information, etc.).

When the method 200 determines that the classification of the message corresponds to an order at block 222, the method 200 may include generating an order based on the information extracted at block 218 (block 226). Generating an order may include checking a pricing API (block 228). For example, the method 200 may retrieve a real-time price corresponding to a product identified in the message from the pricing API. It should be appreciated that in circumstances wherein the intent of the message (e.g., that the message corresponds to an order), the method 200 may completely bypass any staging. The method 200 may bypass staging based on a confidence assigned to the message classification and/or other conditions identified at previous steps of the method 200. For example, if message classification at step 214 classifies the message as an order with confidence greater than 0.75, and the classify sender block 210 identifies the sender as a known commercial customer, then the order may be automatically generated without staging at block 226. It should be envisioned that many business rules may be encoded using such rules. In cases wherein a confidence is beneath a threshold, the method 200 may stage the message for further retrieval and/or analysis.

Revisiting block 220; when the message is a quote the method 200 may include generating a quote based on the information extracted (block 230). Generating the quote may include executing a set of computer-executable instructions that accept one or more parameters and, based on those parameters, creates a quote. A quote may be an electronic object including one or more items by product number and respective quantity, a subtotal, a total, a tax/VAT amount, a shipping fee, etc. The quote may be associated with staging state information, as described above, in the database 130.

Generating the quote may include checking a pricing API (block 228). The pricing API may be queried according to one or more inputs (e.g., EDC, customer code, company code, etc.). In response to queries, the pricing API may output price, price code, price level, price source, etc. If multiple prices are available for a certain input, then the API may return the lowest price. The method 200 may include passing the lowest price and/or other information returned by the pricing API to another system/API for generating a quote. For example, when the information extraction step at block 218 determines that a customer wants to order a quantity of 10 widgets associated with a particular code, the method 200 may call a pricing API passing the quantity and code of the widgets as parameters. The pricing API may return an overall price, or an itemized price that the method 200 may insert into the generated quote (e.g., in the body of an email). For example, the method 200 may include instructions for outputting a list of prices formatted in an HTML table. In some embodiments, the pricing API may be an aspect of the product API 138.

Both AMs and customers may send RFQ messages that are written in natural language. The quote may be associated with a user (e.g., a customer and/or an AM). In the above example, the message included:

Hi Paul, We want a quote for the following products: Tripp Lite DVI Coupler Gender Changer Adapter Connector Extender DVI-I F/F EDC #1141357 QTY 5 Crucial MX500—solid state drive—1 TB—SATA 6 Gb/s EDC #4913706 QTY 2 C2G Value Series video cable—S-Video—25 ft EDC #1700883 QTY 2

Here, the method 200 may classify the message as corresponding to a quote and may extract the following EDC/manufacturer codes and quantity tuples during information extraction:

(1141357,5), (4913706,2), (1700883,2).

If customer messages were always written in a structured format, then determining the codes and quantities during the information extraction process would be trivial. An approach in the prior art uses regular expressions exclusively for such determinations. However, in reality, an email may include infinitely many combinations of numbers in differing formats. For example, each RFQ may include multiple products associated with one or more quantities: "can I get one/1 of . . . ?" or, "can I get one of the following: x product, y product, and z product?", or "can I get one X, two Yz, and three Zs." And at minimum, an EDC code, a price, a quantity, and a customer code may be necessary to create a quote/order. However, a message may be classified and then staged as either a quote or an order, even if insufficient information is present.

Message Staging

The method 200 may include staging the quote (block 232). As discussed above, the staging module of FIG. 1 may create electronic records representing staging state information. For example, the staging module may receive the quote generated at block 230. The staging module may access various attributes of the quote (e.g., buyer information, quantity information, pricing information, etc.). The staging module may check whether the quote is complete by executing a set of quote completion rules. The quote completion rules may include default checks with respect to attributes of the quote (e.g., quantity must be a positive integer, buyer name cannot be blank, etc.). The quote completion rules may include customer-specific rules. The staging module may control the flow of the method 200. For example, the staging module may cause the method 200 to abort if, for example, the customer has requested that an AM manually review all staged quotes before transmission. In other cases, the staging module may cause the quote to be transmitted to the AM for approval (block 234). The AM may be a default AM, an AM associated with a customer's account, the sender of the message, or any other suitable AM that can be identified by any suitable means. As discussed below, transmitting the message to the AM may include delivering an email to the AM (e.g., via the mail server 140). In other embodiments, the message may be injected into a mail client of the AM (e.g., a Microsoft Outlook client), including a quote message.

Figure 3:
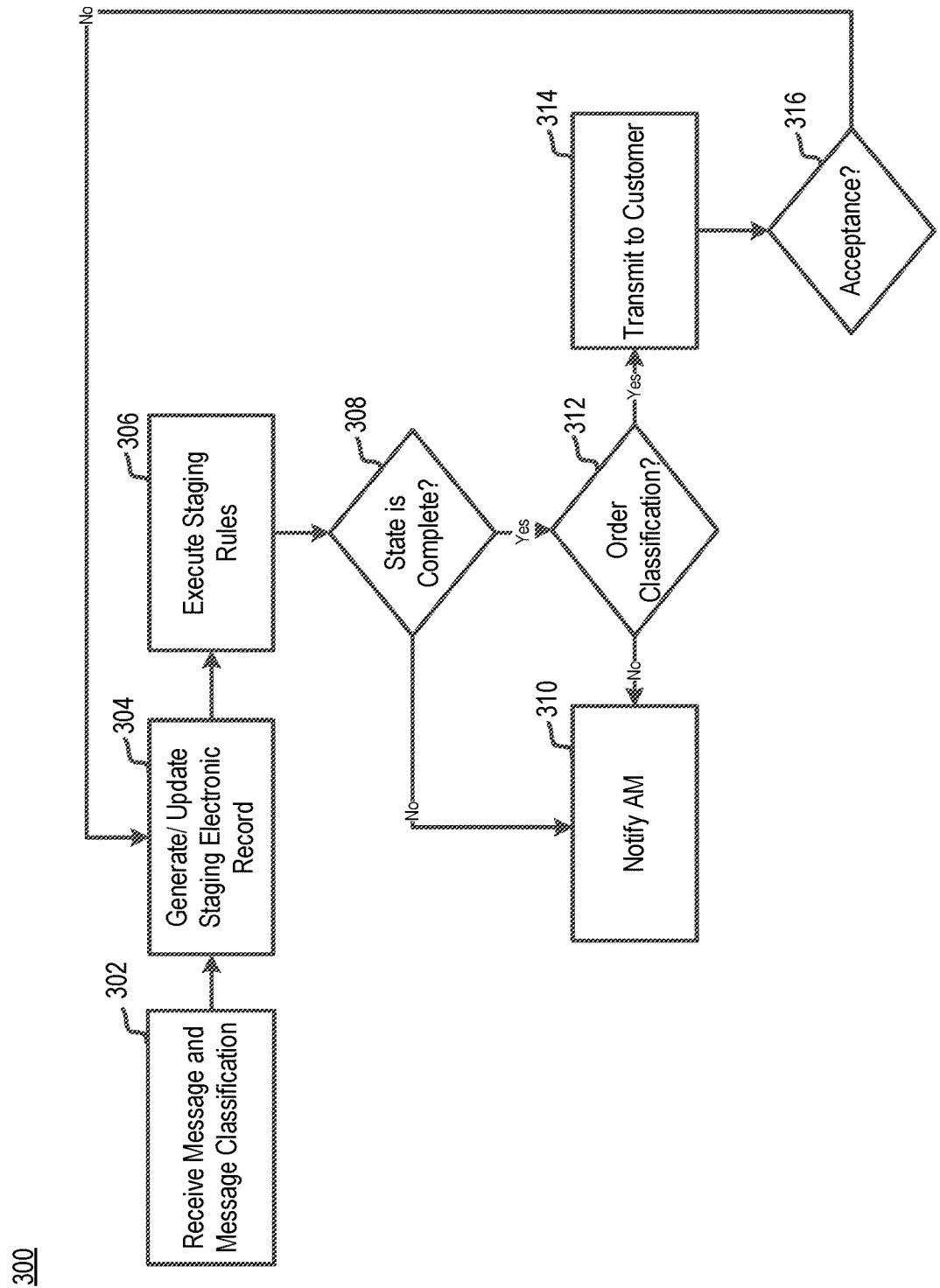
FIG. 3 depicts a block diagram of an example message staging method, according to an embodiment.

The AM may review the staged quote in a number of formats, depending on the embodiment. In one embodiment, the staging module may create a forwarded email or an email reply message (e.g., a MIME or plain text email). The email may be automatically inserted into a folder of the AM's email account (e.g., a drafts folder, an inbox, etc.). In some embodiments, an AM may review staged quotes in a web application (e.g., a virtual shopping cart). The virtual shopping cart may depict a list of staged quotes, grouped by customer. The virtual shopping cart may display the staging state information relating to each staged quote. The AM may approve the quote by, for example, replying to an email or selecting an approval user interface element (e.g., a link, button, etc.). Once the AM approves a staged quote, the method 200 may include transmitting the AM-approved quote to the customer (block 236). For example, the method 200 may email the quote to the customer. In another embodiment, the method 200 may transmit a link to a customer-facing web application wherein the customer may view the quote, approve the quote, modify the quote, annotate the quote, and/or reject the quote. When the customer takes an action other than accepting the quote, the state module may update the status of the quote and the method 200 may return to block 232, and the method 200 may send a further notification to the AM. When the customer accepts the quote, the quote may be transformed into an order (block 226). EXAMPLE MESSAGE STAGING USING ML-BASED TECHNIQUES FIG. 3 depicts an example message staging method 300, which may be performed by a module in the application modules 114 of FIG. 1. The method 300 may include receiving a message and a message classification (block 302). For example, the message may be the electronic message depicted in FIG. 2, such as an email, a text message, etc. The message classification may be one or more classes generated by an ML classifier model, as discussed above. In some embodiments, receiving the electronic message at block 302 may include receiving a quote electronic object or an order electronic object. Receiving the message may include retrieving the message from a database (e.g., the database 130). Receiving the message may include receiving metadata and/or the output of ML models generated during the classification, normalization, and information extraction steps discussed with respect to FIG. 2.

The method 300 may include creating a staging electronic record (block 304). For example, the method 300 may insert a row into a staging table of the database 130 corresponding to a unique identifier of the message (e.g., a Message-ID email header, a primary key of another database table, a hash of the message, etc.). Creating the staging electronic record may include setting state variables of the staging electronic record. Setting state variables may be based on analyzing the metadata, the message, and/or one or more message class associated with the message. The method 300 may include updating a staging electronic record at block 304. For example, as depicted in FIG. 2, when an AM does not approve of a staged message, the control flow of the method 200 may return to the staging block 232. At that time, the method 300 may update one or more staging state variables associated with of the message under review. For example, the variable APPROVED may be set to False. The REJECTED_BY state variable may be set to an identifier associated with the AM, and so forth. Similarly, when the customer takes an action other than accepting the quote at block 238, control of the method 200 is returned to the staging block 232. At that time, the method 300 may update the staging state variables to reflect the customer's rejection, modification, etc. of the message (e.g., quote or order) under review.

The method 300 may include retrieving and executing a set of staging rules (block 306). For example, as discussed above, the staging rules may set the state of the staged record based on the contents of the message/quote received at block 302. For example, a rule may dictate that a staged order may not be transmitted to a customer if the customer belongs to a government entity. Another rule may dictate that a quote must have a non-zero quantity and price before it may be transmitted to a customer. Many rules encoding business logic are envisioned, and the rules may be written in a lightweight language (e.g., a scripting language or visual programming language) to enable users to quickly update and modify the rules in response to business demands.

The method 300 may evaluate each of the set of staging rules to determine whether the message state is complete (block 308). When the message state is not complete, the method 300 may include notifying the AM (block 310). The AM may then approve the message (e.g., create a quote or order) or modify the message. As discussed above, the method 300 may notify the AM using any suitable mechanism, including by forwarding the message as an email to the AM, by emailing the AM a link to a web page allowing the AM to view staged records corresponding to the message, etc. When evaluation of the rules by the method 300 indicates that the message is complete, the method 300 may include determining whether the message is an order (block 312). When the message is not an order, the method 300 may include notifying the AM (block 310). For example, the AM may receive an email message stating that a particular quote is complete. The message may include the quote or a link to the quote. The quote may be represented in any suitable format, such as by an electronic object in a database, a document, a purchase order, an invoice, etc. When the message is classified as an order, the method 300 may include, at block 312, transmitting the order to the customer (block 314), as discussed above. If the customer takes any action other than acceptance, the method 300 may include updating the electronic staging record associated with the message (block 316).

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for improving machine learning-based identification and interpretation of specific customer requests and account manager virtual assistant staging, executed by at least one processor of a computer, comprising:
receiving, via a mail server communicatively coupled to an electronic network, an electronic mail message of a user and a message classification corresponding to the electronic mail message,
wherein the message classification is output by one or more trained machine learning models;
generating an electronic staging record corresponding to the electronic mail message,
wherein the generating includes processing the electronic mail message using a trained information extraction machine learning model to output one or more product code-quantity tuples;
generating a message complete status by analyzing the electronic mail message using a set of staging rules; and
when the message classification corresponds to an order and the message complete status is complete:

generating an order corresponding to the message, wherein the order includes the one or more product code-quantity tuples; and transmitting the order to the user.

2. The method of claim 1 wherein the electronic mail message of the user is an email and the message classification corresponding to the electronic mail message is a quote.

3. The method of claim 1, further comprising:
when the user takes an action with respect to the transmitted order, updating the electronic staging record corresponding to the electronic mail message to include an indication of the action.

4. The method of claim 3, wherein the action is one or both of 1) a rejection of the order, and 2) a modification of the order.

5. The method of claim 1, wherein generating an electronic staging record corresponding to the electronic mail message includes receiving an identifier associated with the user and selecting a staging electronic record from an electronic database based on the identifier.

6. The method of claim 1, wherein generating a message complete status includes executing one or more staging rules.

7. The method of claim 1, further comprising:
when the message complete status is incomplete, notifying an account manager.

8. The method of claim 7, further comprising:
receiving, from the account manager, a request to modify at least one state variable of the electronic staging record, the request including a new value, and
updating the at least one state variable by overwriting an existing value of the at least one state variable with the new value.

9. The method of claim 1, further comprising:
when the message classification is not an order, notifying an account manager.

10. The method of claim 1, wherein generating an order includes retrieving, from a pricing application programming interface, a real-time price of an item included in the order.

11. An account manager virtual assistant staging system, comprising:
one or more processors;
a mail server; and
a memory storing computer-readable instructions that, when executed, cause the account manager virtual assistant staging system to:
receive, via the mail server, an electronic mail message of a user and a message classification corresponding to the electronic mail message,
wherein the message classification is output by one or more trained machine learning models;
generate an electronic staging record corresponding to the electronic mail message,
by processing the electronic mail message using a trained information extraction machine learning model to output one or more product code-quantity tuples;
generate a message complete status by analyzing the electronic mail message using a set of staging rules; and
when the message classification corresponds to an order and the message complete status is complete:
generate an order corresponding to the message, wherein the order includes the one or more product code-quantity tuples; and
transmit the order to the user.

12. The account manager virtual assistant staging system of claim 11, wherein the electronic mail message of the user is an email and the message classification corresponding to the electronic mail message is a quote.

13. The account manager virtual assistant staging system of claim 11, the memory storing further computer-readable instructions that, when executed, cause the account manager virtual assistant staging system to:
when the user takes an action with respect to the transmitted order, update the electronic staging record corresponding to the electronic mail message to include an indication of the action.

14. The account manager virtual assistant staging system of claim 13, wherein the action is one or both of 1) a rejection of the order, and 2) a modification of the order.

15. The account manager virtual assistant staging system of claim 11, the memory storing further computer-executable instructions that, when executed, cause the account manager virtual assistant staging system to:
receive an identifier associated with the user and
select, based on the identifier, a staging electronic record from an electronic database.

16. The account manager virtual assistant staging system of claim 11, the memory storing further computer-executable instructions that, when executed, cause the account manager virtual assistant staging system to:
execute one or more staging rules.

17. A non-transitory computer readable medium containing program instructions that when executed, cause a computer to:
receive, via a mail server, an electronic mail message of a user and a message classification corresponding to the electronic mail message,
wherein the message classification is output by one or more trained machine learning models;
generate an electronic staging record corresponding to the electronic mail message,
by processing the electronic mail message using a trained information extraction machine learning model to output one or more product code-quantity tuples;
generate a message complete status by analyzing the electronic mail message using a set of staging rules; and
when the message classification corresponds to an order and the message complete status is complete:
generate an order corresponding to the message, wherein the order includes the one or more product code-quantity tuples; and
transmit the order to the user.

18. The non-transitory computer readable medium of claim 17, wherein the electronic mail message of the user is an email and the message classification corresponding to the electronic mail message is a quote.

19. The non-transitory computer readable medium of claim 17 containing further program instructions that, when executed, cause the computer to:
when the user takes an action with respect to the transmitted order, update the electronic staging record corresponding to the electronic mail message to include an indication of the action.

20. The non-transitory computer readable medium of claim 17 containing further program instructions that, when executed, cause the computer to:
execute one or more staging rules.

* * * * *